United States Patent
Kato

(10) Patent No.: US 9,016,592 B2
(45) Date of Patent: *Apr. 28, 2015

(54) ANTENNA DEVICE AND COMMUNICATION TERMINAL APPARATUS

(71) Applicant: Murata Manufacturing Co., Ltd., Nagaokakyo-shi, Kyoto-fu (JP)

(72) Inventor: Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,736

(22) Filed: Jun. 19, 2014

(65) Prior Publication Data

US 2014/0292586 A1  Oct. 2, 2014

Related U.S. Application Data

(63) Continuation of application No. 14/031,270, filed on Sep. 19, 2013, now Pat. No. 8,814,056, which is a continuation of application No. PCT/JP2012/067537, filed on Jul. 10, 2012.

(30) Foreign Application Priority Data

Jul. 19, 2011   (JP) .................................. 2011-157753

(51) Int. Cl.
| | |
|---|---|
| *G06K 19/06* | (2006.01) |
| *H01Q 9/04* | (2006.01) |
| *H04B 5/00* | (2006.01) |
| *H01Q 1/22* | (2006.01) |
| *H01Q 7/00* | (2006.01) |
| *G06K 19/077* | (2006.01) |

(52) U.S. Cl.
CPC ........... *H01Q 9/0457* (2013.01); *H04B 5/0075* (2013.01); *H01Q 1/2225* (2013.01); *H01Q 7/00* (2013.01); *G06K 19/07783* (2013.01); *H04B 5/0062* (2013.01); *G06K 19/07794* (2013.01)

(58) Field of Classification Search
USPC .................................................. 235/492, 494
See application file for complete search history.

(56) References Cited

U.S. PATENT DOCUMENTS 8,814,056 B2 *  8/2014  Kato ............................. 235/494

OTHER PUBLICATIONS

Kato; "Antenna Device, RFID Tag, and Communication Terminal Apparatu"; U.S. Appl. No. 14/031,270, filed Sep. 19, 2013.

* cited by examiner

*Primary Examiner* — Christle I Marshall
(74) *Attorney, Agent, or Firm* — Keating & Bennett, LLP

(57) ABSTRACT

An RFIC element includes a capacitance therein. By this capacitance and an inductance of a loop-shaped conductor, an LC resonant circuit is provided. When UHF-band high-frequency power is supplied to the loop-shaped conductor from the RFIC element, the loop-shaped conductor is coupled to a flat conductor in an electromagnetic field by a current flowing through the loop-shaped conductor, and induced currents flow through the flat conductor. By propagation of the induced currents through the flat conductor, the flat conductor acts as a radiation element. It is preferred that the dimension in the longitudinal direction of the flat conductor be a half wavelength of the used frequency band. Accordingly, the flat conductor acts as a half-wave radiation element.

11 Claims, 18 Drawing Sheets

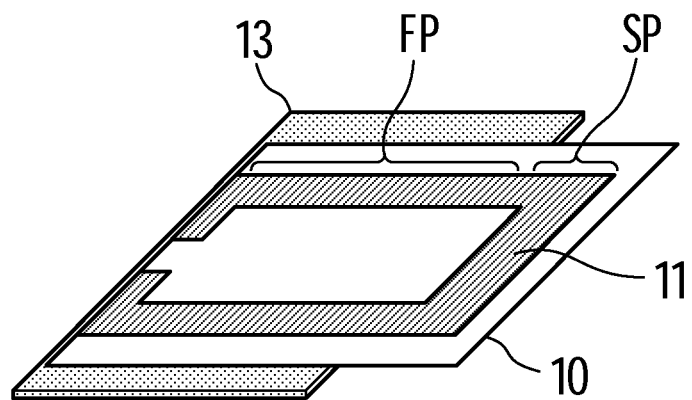
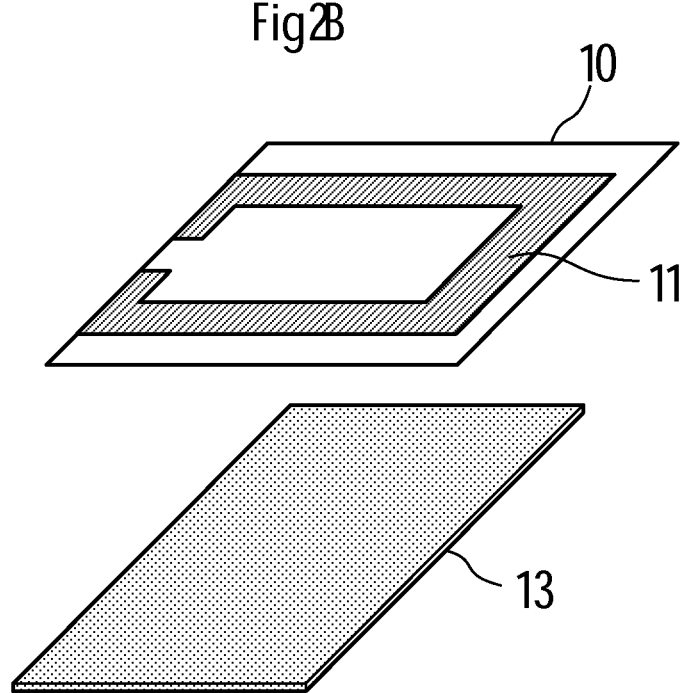

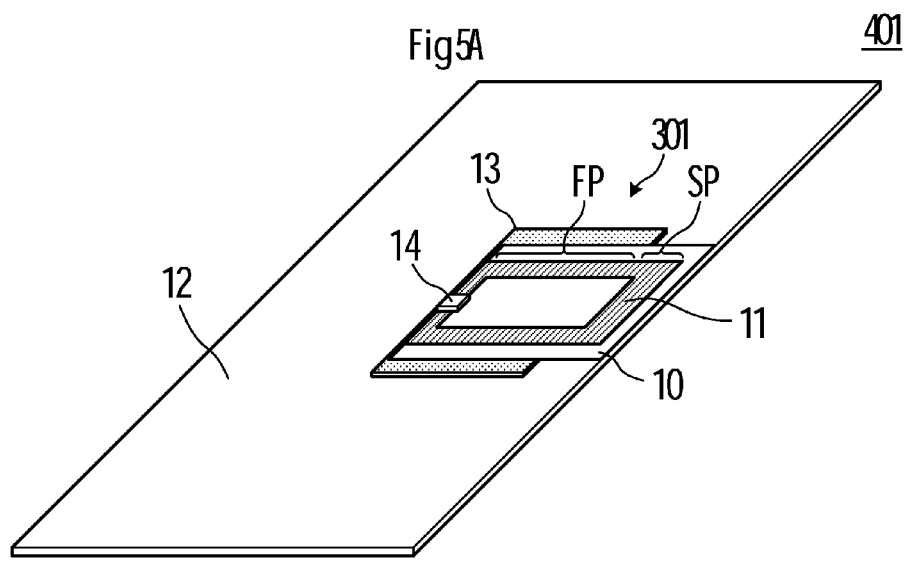
Fig5A
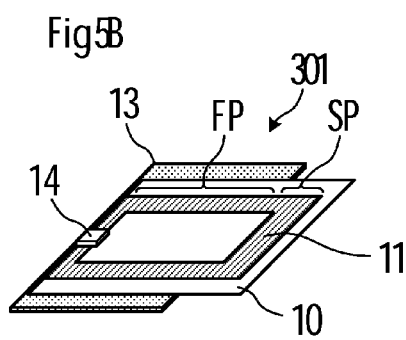
Fig5B
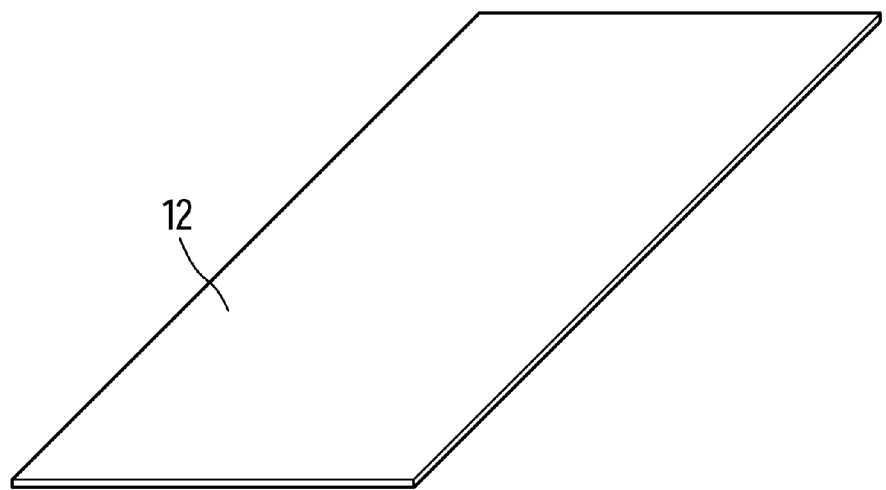

ANTENNA DEVICE AND COMMUNICATION TERMINAL APPARATUS

BACKGROUND OF THE INVENTION

1. Field of the Invention

The present invention relates to an antenna device, an RFID tag, and a communication terminal apparatus which are preferably used for near field communication.

2. Description of the Related Art

An RFID system in which a reader/writer and an RFID (Radio Frequency Identification) tag communicate with each other by a contactless scheme to transmit information between the reader/writer and the RFID tag is proliferating. For RFID systems, an HF-band RFID system using the 13 MHz band and a UHF-band RFID system using the 900 MHz band are commonly used. In particular, for an RFID system for item management, a UHF-band RFID system is a promising system in terms of its long communication distance and capability to perform reading and writing multiple tags at a time.

An RFID tag used in an RFID system includes an RFIC chip for processing radio signals and an antenna element for transmitting and receiving radio signals. An RFID tag for the UHF band uses a dipole antenna or a loop antenna as an antenna element. In particular, the loop antenna is useful as an antenna for a compact RFID tag because, although it is a magnetic field radiation type antenna and thus has a slightly short communication distance, it can achieve miniaturization.

In the case of using a loop antenna, in a situation in which an open surface of the loop antenna faces a metal body, if an affixation target item is a metal body, for example, eddy current that cancels out magnetic field changes in the loop antenna is generated in the metal body, which makes it difficult to secure a sufficient communication distance.

To solve the problem of eddy current, as described in, for example, Japanese Patent Unexamined Publication No. 2004-166175 bulletin or the like, there is known a technique for interposing a magnetic material such as ferrite between a loop antenna and an affixation target.

FIG. 1A is a perspective view of an antenna for a reader/writer shown in Japanese Patent Unexamined Publication No. 2004-166175 bulletin, and FIG. 1B is a cross-sectional view of an A-A' portion of FIG. 1A. In the antenna for a reader/writer, a soft magnetic material 5 is disposed between an antenna coil 4 whose both ends are connected to an electronic circuit 8 and a metal surface 6. As shown in FIG. 1B, magnetic fluxes 9 generated in the antenna coil 4 pass through the soft magnetic material 5 and do not reach the inside of the metal surface 6 almost at all. Thus, a change in resonance frequency and an increase in loss caused by eddy current generated in the metal surface 6 are suppressed.

However, in the antenna having the structure shown in FIGS. 1A and 1B, it is difficult to sufficiently block entry of magnetic fluxes into a metal body, depending on the used frequency band, the thickness of the magnetic material, or the like. That is, to suppress the influence of the metal body, the magnetic material needs to be thickened, which in turn increases the sizes of an antenna device and an apparatus including the antenna device.

SUMMARY OF THE INVENTION

Preferred embodiments of the present invention provide an antenna device, an RFID tag, and a communication terminal apparatus that suppress or prevent an increase in loss and a change in resonance frequency caused by eddy current generated in a metal surface, without increasing size.

An antenna device according to a preferred embodiment of the present invention includes an antenna module including a loop-shaped conductor to which a feed circuit is connected or coupled, and a magnetic sheet parallel or substantially parallel to the loop-shaped conductor; and a flat conductor disposed so as to face the antenna module, and having an area larger than the loop-shaped conductor, wherein the loop-shaped conductor includes a first portion facing the flat conductor with the magnetic sheet therebetween, and a second portion directly electrically connected or coupled in an electromagnetic field to the flat conductor without the magnetic sheet therebetween, the loop-shaped conductor includes a feed point connected or coupled to the feed circuit, and a current maximum point spaced away from the feed point, and the second portion is a region including the current maximum point, the loop-shaped conductor is disposed close to the flat conductor such that a surface defined by the loop-shaped conductor extends along a surface of the flat conductor, and the loop-shaped conductor is disposed at a location where the second portion is closer to an end edge portion side of the flat conductor than the center of the flat conductor.

With this configuration, when predetermined power is supplied from the feed circuit to the loop-shaped conductor, a portion of a current flowing through the loop-shaped conductor is guided to the flat conductor through the second portion. By propagation of this current through the flat conductor, the flat conductor acts as a radiation element.

It is preferred that the second portion of the loop-shaped conductor be linear, and the loop-shaped conductor be disposed to be parallel or substantially parallel to a linear end edge portion of the flat conductor.

In the antenna device of one of the preferred embodiments of the present invention described above, it is preferred that the flat conductor be a ground conductor located on a printed wiring board.

An RFID tag according to a preferred embodiment of the present invention includes the antenna device according to any one of the above-described preferred embodiments of the present invention, and an RFIC element directly connected or coupled in an electromagnetic field to the loop-shaped conductor.

A communication terminal apparatus according to a preferred embodiment of the present invention includes the antenna device according to any one of the above-described preferred embodiments of the present invention, and an RFIC element directly connected or coupled in an electromagnetic field to the loop-shaped conductor.

It is preferred that the flat conductor be a ground conductor located on a printed wiring board.

It is also preferred that the RFIC element be used in a UHF-band RFID system where the RFIC element achieves matching with the loop-shaped conductor in a UHF band, for example.

According to various preferred embodiments of the present invention, an antenna device, an RFID tag, a communication terminal apparatus, or the like, suppress or prevent an increase in loss and a change in resonance frequency caused by eddy current generated in a metal surface, without increasing size.

The above and other elements, features, steps, characteristics and advantages of the present invention will become more apparent from the following detailed description of the preferred embodiments with reference to the attached drawings.

BRIEF DESCRIPTION OF THE DRAWINGS

2004-166175 bulletin.

FIG. 2A is an external perspective view of an antenna module 101 according to a first preferred embodiment of the present invention, and FIG. 2B is an exploded perspective view thereof.

FIG. 5A is a perspective view of a communication terminal apparatus 401, and FIG. 5B is an exploded perspective view thereof.

DETAILED DESCRIPTION OF THE PREFERRED EMBODIMENTS

First Preferred Embodiment

Figure 1A:
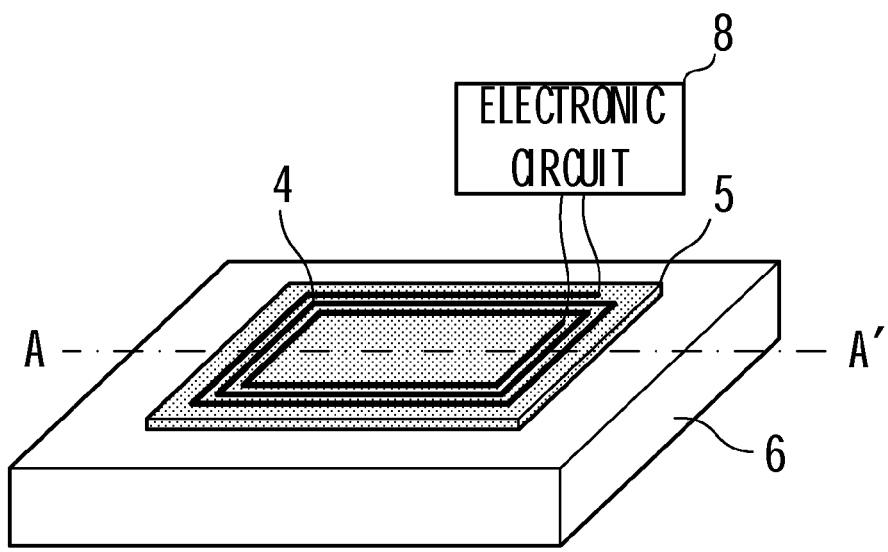
FIG. 1A is a perspective view of an antenna for a reader/writer shown in Japanese Patent Unexamined Publication No.
Figure 1B:
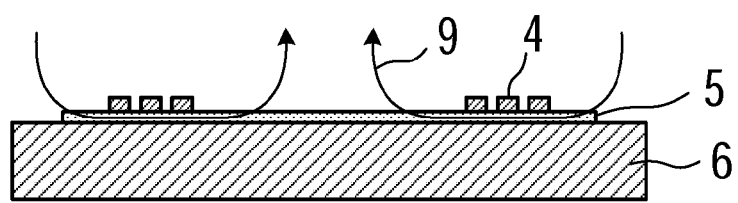
FIG. 1B is a cross-sectional view of an A-A' portion of FIG. 1A.

An antenna module, an antenna device, an RFID tag, and a communication terminal apparatus of a first preferred embodiment of the present invention will be described in turn with reference to the drawings.

FIG. 2A is an external perspective view of an antenna module 101 according to the first preferred embodiment, and FIG. 2B is an exploded perspective view thereof.

The antenna module 101 includes a loop-shaped conductor 11 and a magnetic sheet 13. The loop-shaped conductor 11 preferably is a rectangular or substantially rectangular loop-shaped conductive pattern formed on a base sheet 10. As will be shown later, the antenna module 101 is affixed, abuts, or is disposed close to a flat conductor, by which an antenna device is provided. Then, the magnetic sheet 13 is disposed between the loop-shaped conductor 11 and the flat conductor.

The loop-shaped conductor 11 includes a first portion FP facing the flat conductor with the magnetic sheet 13 therebetween; and a second portion SP coupled to the flat conductor 12 in an electromagnetic field without the magnetic sheet 13 therebetween. That is, the magnetic sheet 13 is interposed between the first portion FP of the loop-shaped conductor 11 and the flat conductor, and the magnetic sheet 13 is not interposed between the second portion SP of the loop-shaped conductor 11 and the flat conductor.

The base sheet 10 is, for example, a flexible base sheet such as a PET film or a polyimide film, and the loop-shaped conductor 11 is obtained by patterning a metal foil such as a copper foil. The magnetic sheet 13 is, for example, a ferrite ceramic preferably having a sheet-shaped configuration. Alternatively, the magnetic sheet 13 may be a resin sheet formed by dispersing magnetic filler of ferrite or the like in a resin, for example.

Figure 3A:
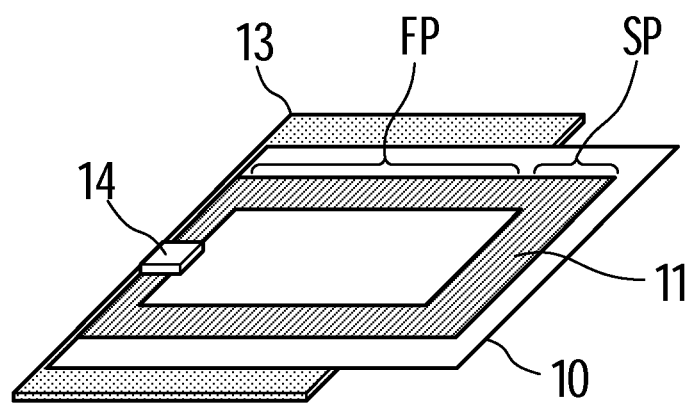
FIG. 3A is a perspective view of an RFID tag 301.
Figure 3B:
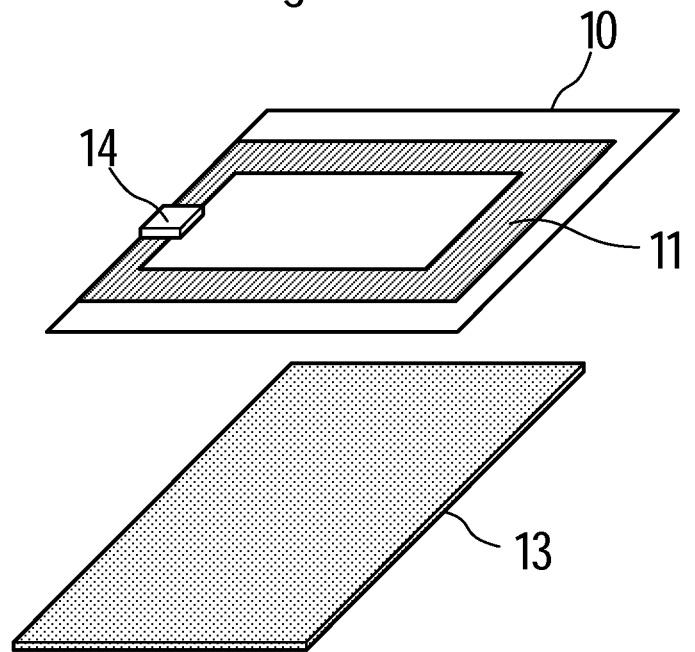
FIG. 3B is an exploded perspective view thereof.

FIG. 3A is a perspective view of an RFID tag 301, and FIG. 3B is an exploded perspective view thereof. The RFID tag 301 is obtained preferably by mounting an RFIC element 14 on the base sheet 10 of the antenna module 101 shown in FIG. 2A. The RFIC element 14 includes at least two terminals, and a first terminal is connected to a first end of the loop-shaped conductor 11 and a second terminal is connected to a second end of the loop-shaped conductor 11. As will be shown later, the RFID tag 301 is affixed or disposed close to a flat conductor. At that time, the magnetic sheet 13 is disposed between the loop-shaped conductor 11 and the flat conductor. Accordingly, an item with an RFID tag or a communication terminal apparatus having RFID function is provided.

Figure 4:
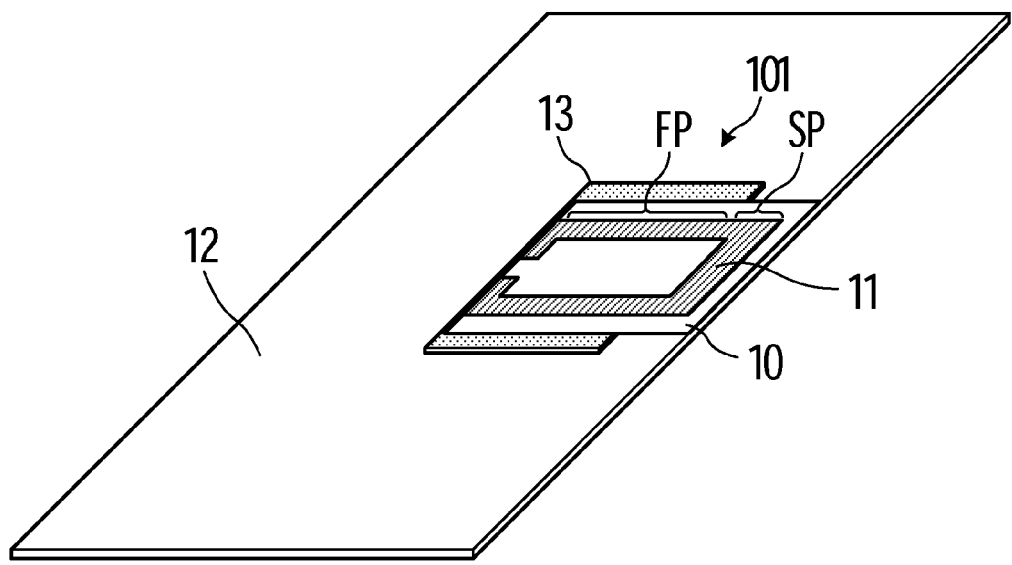
FIG. 4 is a perspective view of an antenna device 201.

FIG. 4 is a perspective view of an antenna device 201. The antenna device 201 includes the antenna module 101 shown in FIG. 2A and a flat conductor 12. The flat conductor 12 has an area larger than the loop-shaped conductor 11, and the loop-shaped conductor 11 is located within the area of the flat conductor 12 when viewed from the top. The magnetic sheet 13 is disposed between the loop-shaped conductor 11 and the flat conductor 12.

The magnetic sheet 13 is interposed between the first portion FP of the loop-shaped conductor 11 and the flat conductor 12, and the magnetic sheet 13 is not interposed between the second portion SP of the loop-shaped conductor 11 and the flat conductor 12. The flat conductor 12 is a ground conductor of a printed wiring board, a metal plate, a metal member of an electronic component or a structural component, or the like.

FIG. 5A is a perspective view of a communication terminal apparatus 401, and FIG. 5B is an exploded perspective view thereof. The communication terminal apparatus 401 includes a flat conductor 12 and the RFID tag 301. The flat conductor 12 is, for example, a ground conductor located on a printed wiring board. That is, a printed wiring board contained in a housing of the communication terminal apparatus can also be used as a flat conductor.

Alternatively, for example, when the flat conductor 12 is a metal item or an item having a flat conductor, by affixing the RFID tag 301 to the item, the item with the RFID tag is provided.

Figure 6A:
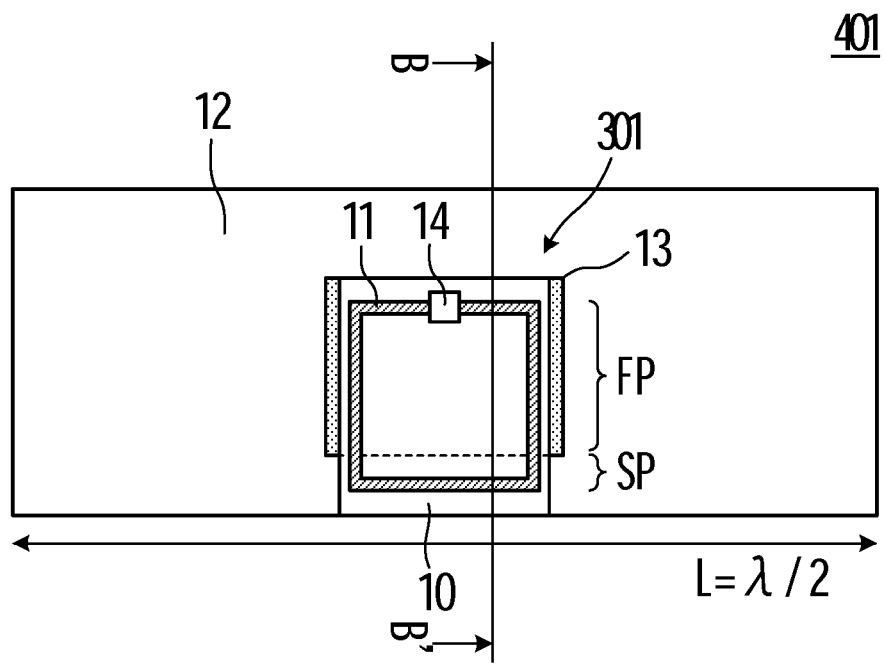
FIG. 6A is a plan view of the communication terminal apparatus 401.
Figure 6B:
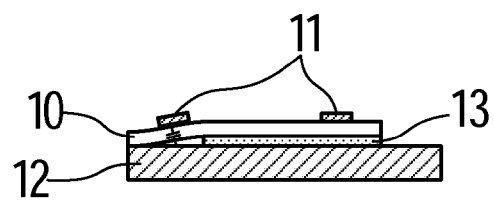
FIG. 6B is a cross-sectional view of a B-B' portion of FIG. 6A.

FIG. 6A is a plan view of the communication terminal apparatus 401, and FIG. 6B is a cross-sectional view of a B-B' portion of FIG. 6A. A circuit symbol for a capacitor in FIG. 6B represents a capacitance generated between the second portion SP of the loop-shaped conductor 11 and the flat conductor 12.

Figure 7A:
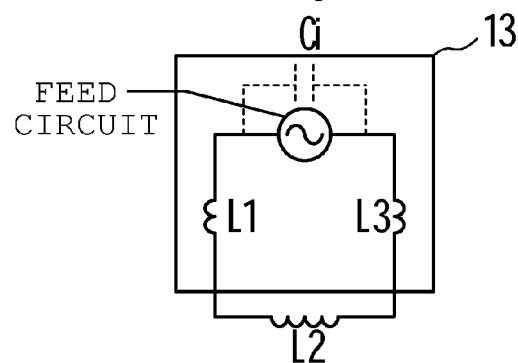
FIG. 7A is an equivalent circuit diagram of the RFID tag 301.

FIG. 7A is an equivalent circuit diagram of the RFID tag 301. The RFIC element 14 includes therein a capacitance Ci, and an LC resonant circuit includes inductors L1, L2, and L3 defined by the loop-shaped conductor 11 and the capacitance Ci. The inductance of the inductors L1 and L3 at a portion of the loop-shaped conductor 11 that is shielded by the magnetic sheet 13 is relatively small, and the inductance of the inductor L2 at a portion of the loop-shaped conductor 11 that is not shielded by the magnetic sheet 13 is relatively large.

Figure 7B:
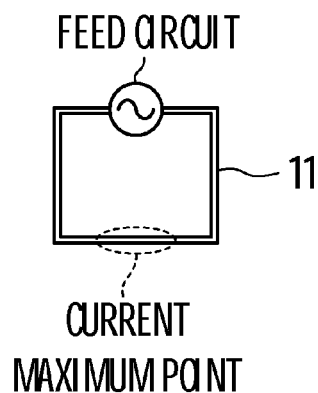
FIG. 7B is a diagram showing the relationship between a feed point and a current maximum point of a loop-shaped conductor 11.

FIG. 7B is a diagram showing the relationship between a feed point and a current maximum point of the loop-shaped conductor 11. The RFIC element 14 (a feed circuit of the RFIC element 14) is connected to the first and second ends of the loop-shaped conductor 11. A differential potential is applied to the loop-shaped conductor 11 from the feed circuit at a resonance frequency at which the loop-shaped conductor 11 achieves impedance matching with the feed circuit, and a central location between the first and second ends of the loop-shaped conductor 11 (a location farthest from the feed circuit) is a current maximum point. The current maximum point is also a virtual ground potential. The above-described resonance frequency is, for example, a frequency in the UHF band such as the 900 MHz band.

Figure 7C:
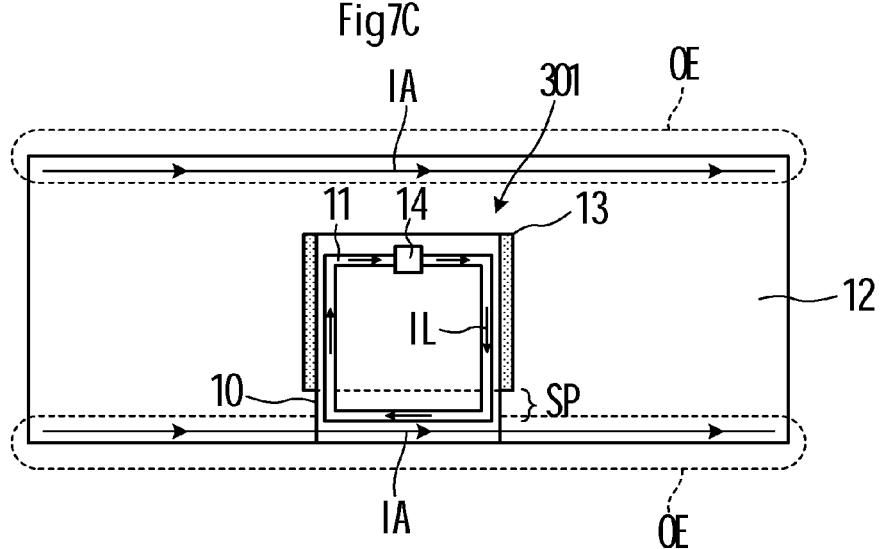
FIG. 7C is a diagram showing the states of a current flowing through the loop-shaped conductor 11 of the RFID tag and currents flowing through a flat conductor 12.

FIG. 7C is a diagram showing the states of a current flowing through the loop-shaped conductor 11 of the RFID tag and currents flowing through the flat conductor 12. When high-frequency power with the above-described resonance frequency (UHF band) is supplied to the loop-shaped conductor 11 from the RFIC element 14, the loop-shaped conductor 11 is coupled to the flat conductor 12 in an electromagnetic field by a current IL flowing through the loop-shaped conductor 11, and induced currents IA flow through the flat conductor 12. At this time, due to the edge effect, the current density of edge portions OE of the flat conductor 12 is high. Hence, the RFID tag 301 is disposed on the flat conductor 12 such that the second portion SP of the loop-shaped conductor 11 extends along one end of the flat conductor 12. In general, it is sufficient that the second portion SP of the loop-shaped conductor 11 be disposed at a location closer to the side of one end edge portion of the flat conductor 12 than the center (the center of gravity) of the flat conductor 12. For a longitudinal direction of the flat conductor, it is sufficient that the second portion SP of the loop-shaped conductor 11 be disposed at a central location thereof or near the center thereof.

By propagation of the induced currents IA through the flat conductor 12, the flat conductor 12 acts as a radiation element. When the wavelength of the used frequency band is represented by $\lambda$, it is preferred that a dimension L in the longitudinal direction of the flat conductor 12 be $L=\lambda/2$ or $L \approx \lambda/2$, for example. Accordingly, the flat conductor 12 acts as a half-wave radiation element (dipole antenna).

In addition, since only the second portion SP of the loop-shaped conductor equivalently faces the flat conductor, even if there are variations in the size of the flat conductor or in the disposition location of the loop-shaped conductor with respect to the flat conductor, the resonance frequency of the resonant circuit including the loop-shaped conductor and the feed circuit does not change much. Hence, a reduction in gain due to a shift in resonance frequency can also be avoided.

Since the length L in the longitudinal direction of the flat conductor 12 is on the order of a half wavelength of the used frequency, the directions of currents flowing through the two edge portions OE are the same, and thus, a current that goes around the perimeter of the flat conductor 12 does not flow.

With the structure shown above, the flat conductor 12 disposed near the loop-shaped conductor 11 can be used as an antenna element, and thus, the communication terminal apparatus 401 including a compact and slim RFID tag with a long communication distance can be obtained without increasing the size of the loop-shaped conductor 11.

The second portion SP of the loop-shaped conductor 11 includes the above-described current maximum point. It is preferred that the loop-shaped conductor 11 be coupled to the flat conductor 12 in an electromagnetic field in a region including the current maximum point. That is, in the loop-shaped conductor 11, the current density is low near the feed point, and the current density is high at a location farthest from the feed point. Thus, if the loop-shaped conductor 11 is coupled to the flat conductor 12 at the second portion SP including a portion of the loop-shaped conductor 11 that has the highest current density, unwanted coupling between the loop-shaped conductor 11 and the flat conductor 12 (coupling in which a current flowing through the flat conductor 12 by the coupling does not contribute to radiation) is suppressed or prevented, enabling to obtain an RFID tag with small insertion loss and the communication terminal apparatus 401 including the RFID tag.

It is preferred that the loop-shaped conductor 11 be disposed close to the flat conductor 12 such that a surface defined by the loop-shaped conductor 11 extends along a surface of the flat conductor 12. In other words, it is preferred that the central axis of the loop-shaped conductor 11 be oriented in the direction of the normal to the flat conductor 12. According to the present preferred embodiment of the present invention, since such disposition is possible, an RFID tag can be disposed along the surface of the flat conductor 12 thus making it possible to achieve reduction in overall thickness.

It is preferred that the loop-shaped conductor 11 be disposed close to the flat conductor 12 such that the second portion SP thereof is near an end edge portion of the flat conductor 12. It is particularly preferred that the second portion SP of the loop-shaped conductor 11 be linear, and the loop-shaped conductor 11 be disposed close to the flat conductor 12 so as to be parallel or substantially parallel to a linear end edge portion of the flat conductor 12. With such a configuration, while eddy current loss in the loop-shaped conductor 11 is suppressed or prevented, the distance between one of the main radiation portions (the end edge portions of the flat conductor 12) and the current maximum point of the loop-shaped conductor 11 is shortest, enabling reduction in power loss.

In addition to using, as a flat conductor, a ground conductor which is originally provided on a printed wiring board, it is also possible that the RFID tag 301 is disposed near a battery pack and a metal housing of the battery pack or a shield case is used as a flat conductor. In addition, if an electronic device includes a metal housing, the metal housing can be used as a flat conductor.

Second Preferred Embodiment

A second preferred embodiment of the present invention shows differences in characteristic by differences in size between a first portion and a second portion of a loop-shaped conductor.

Figure 8A:
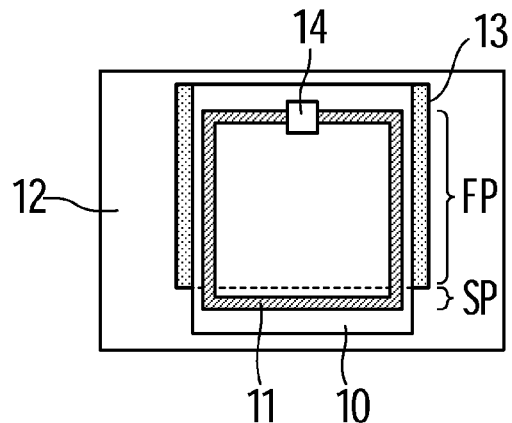
FIG. 8A is a diagram showing an example of a second preferred embodiment of the present invention in which a second portion SP facing a flat conductor without a magnetic sheet 13 therebetween is provided at only substantially one side of a rectangle which is the shape of a loop-shaped conductor 11.
Figure 8B:
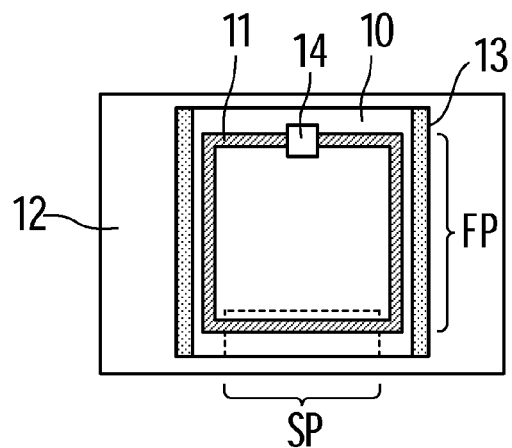
FIG. 8B is a diagram showing an example in which a second portion SP is further narrowed to provide a first portion FP throughout both sides of one side of a rectangle.
Figure 8C:
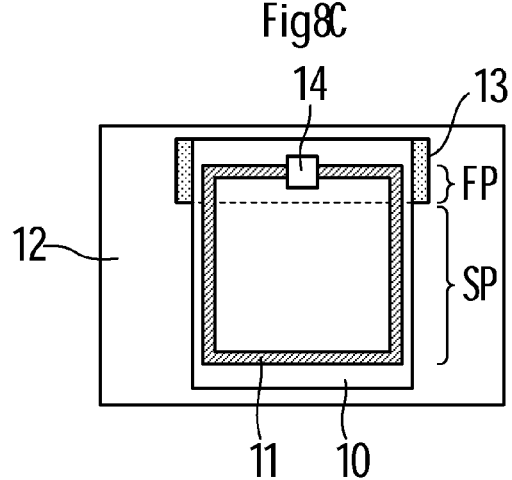
FIG. 8C is a diagram showing an example in which a magnetic sheet is interposed (covered) only at substantially one side of a rectangle which is the shape of a loop-shaped conductor 11, and the remaining three sides serve as a second portion SP.

FIG. 8A shows an example in which a second portion SP facing a flat conductor without a magnetic sheet 13 therebetween is provided at only substantially one side of a rectangle which is the shape of a loop-shaped conductor 11, and FIG. 8B shows an example in which a second portion SP is further narrowed to provide a first portion FP throughout both sides of one side of a rectangle. FIG. 8C shows an example in which, contrary to FIG. 8A, a magnetic sheet is interposed (covered) only at substantially one side of a rectangle which is the shape of a loop-shaped conductor 11, and the remaining three sides serve as a second portion SP. In the state of FIG. 8C, a portion of the loop-shaped conductor 11 that has a potential difference (voltage is high) faces a flat conductor 12. In the state of FIG. 8B, a portion of the loop-shaped conductor 11 that has a potential difference (voltage is high) does not face a flat conductor 12 almost at all.

Figure 9:
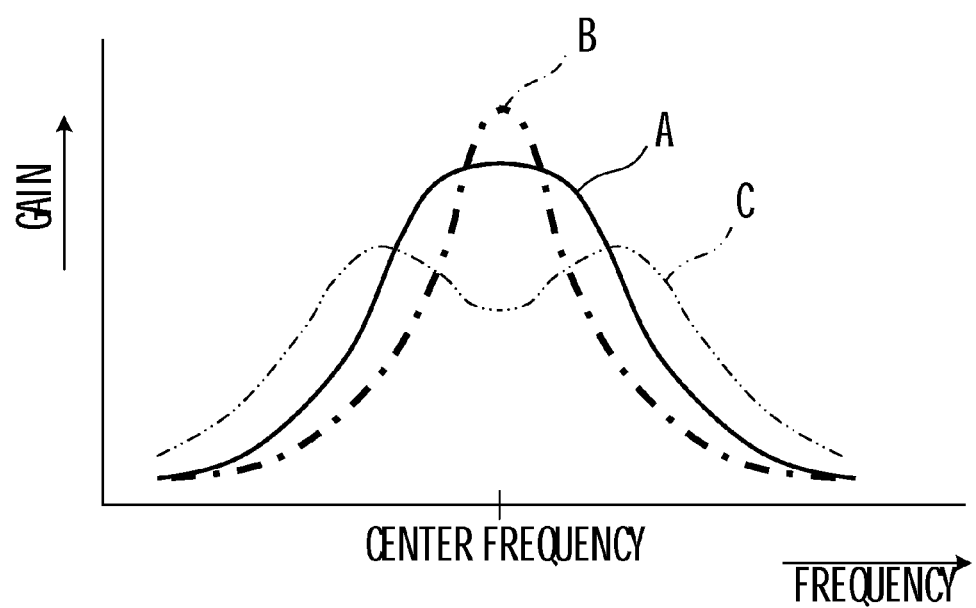
FIG. 9 is a diagram showing the characteristics of RFID tags in the states shown in FIGS. 8A, 8B, and 8C.

FIG. 9 is a diagram showing the characteristics of RFID tags in the states shown in FIGS. 8A, 8B, and 8C. As such, in the case where the second portion SP is smaller in ratio than the first portion FP of the loop-shaped conductor 11, the Q-value is high and the gain is maximum at the center frequency. Then, the larger the ratio of the second portion SP than the first portion FP of the loop-shaped conductor 11, the stronger the electric field coupling between the loop-shaped conductor 11 and the flat conductor 12. In addition, electric field coupling also occurs at a portion of the loop-shaped conductor 11 that has a large potential difference, resulting in a mode in which electric field coupling occurs at two points with different potential differences in the loop-shaped conductor 11. Thus, the passband increases, reducing the peak of the gain. Accordingly, the ratio of the second portion SP to the first portion FP of the loop-shaped conductor 11 is determined according to the required frequency bandwidth and gain.

Third Preferred Embodiment

Figure 10:
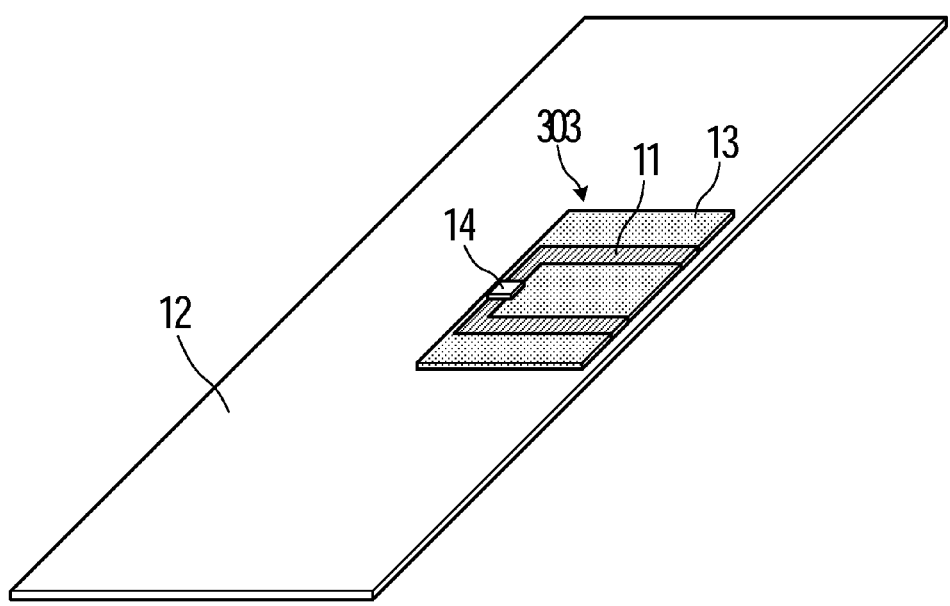
FIG. 10 is a perspective view of a communication terminal apparatus 403 of a third preferred embodiment of the present invention.
Figure 11A:
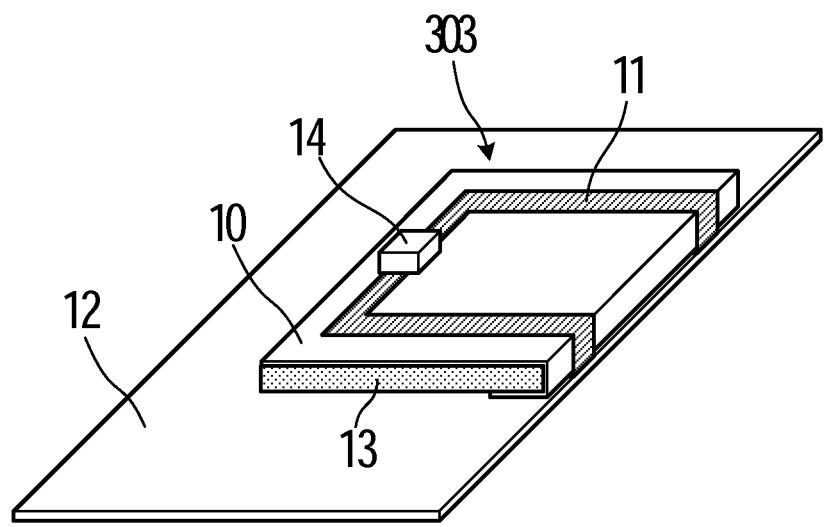
FIG. 11A is an enlarged view of a portion where an RFID tag 303 is mounted.
Figure 11B:
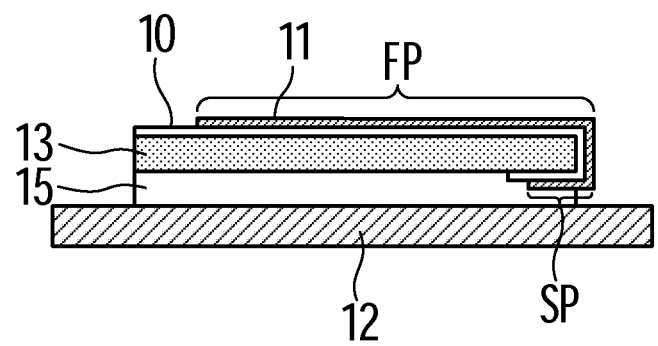
FIG. 11B is a left side view thereof.

FIG. 10 is a perspective view of a communication terminal apparatus 403 of a third preferred embodiment of the present invention. FIG. 11A is an enlarged view of a portion where an RFID tag 303 is mounted, and FIG. 11B is a left side view thereof. The communication terminal apparatus 403 includes a flat conductor 12 and the RFID tag 303. The structure of the RFID tag 303 is different from that of the RFID tag 301 shown in the first and second preferred embodiments. In the RFID tag 303, a portion of a base sheet 10 including a rectangular or substantially rectangular loop-shaped conductor 11 patterned thereon is folded from a first main surface (top surface) of a magnetic sheet 13 over a second main surface (undersurface). The RFID tag 303 is adhered onto the flat conductor 12 by an adhesive layer 15, for example.

Only substantially one side of a rectangle which is the shape of the loop-shaped conductor 11 is disposed on the second main surface (undersurface) of the magnetic sheet 13. This one side serves as a second portion SP where the magnetic sheet 13 is not interposed when viewed from the flat conductor 12. A portion other than this portion serves as a first portion FP where the magnetic sheet 13 is interposed when viewed from the flat conductor 12.

As such, the second portion SP of the loop-shaped conductor can be provided even at a portion along the magnetic sheet. According to the third preferred embodiment, since the entire base sheet 10 is disposed so as to enclose the magnetic sheet, handling of the RFID tag and mounting of the RFID tag on the flat conductor 12 are facilitated.

Fourth Preferred Embodiment

Figure 12:
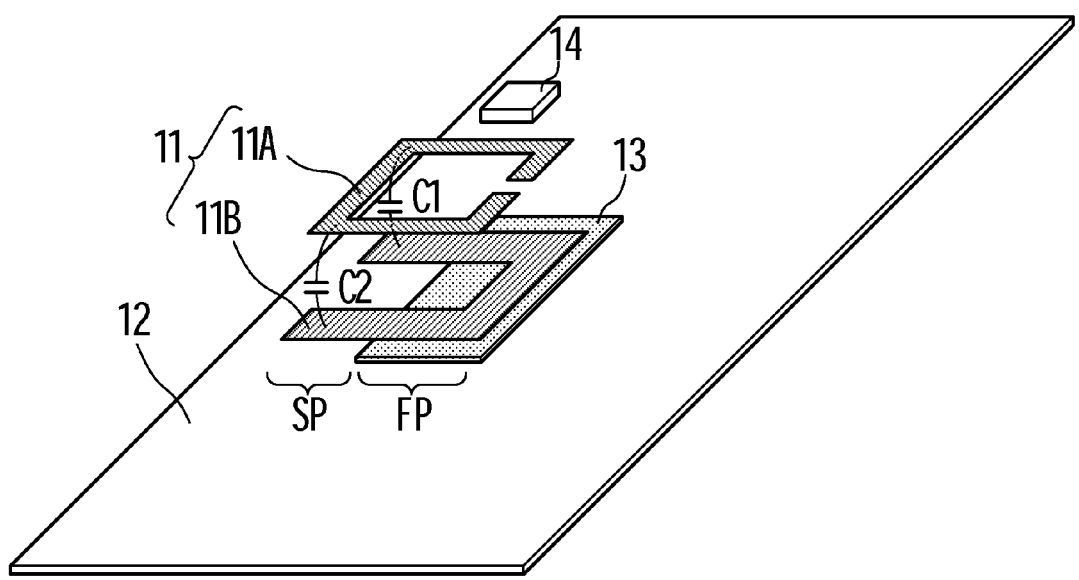
FIG. 12 is a perspective view of a communication terminal apparatus 404 of a fourth preferred embodiment of the present invention.

FIG. 12 is a perspective view of a communication terminal apparatus 404 of a fourth preferred embodiment of the present invention. A loop-shaped conductor includes a first auxiliary conductor 11A and a second auxiliary conductor 11B. The first auxiliary conductor 11A and the second auxiliary conductor 11B are coupled to each other by capacitances C1 and C2. Note, however, that the capacitances C1 and C2 in the drawing are only represented by symbols in terms of a lumped parameter circuit, and are actually distributed capacitances. In the loop-shaped conductor configured by the two auxiliary conductors 11A and 11B, a second portion SP is viewed from a flat conductor 12 because a magnetic sheet 13 is not interposed, but a first portion FP is not equivalently viewed from the flat conductor 12 due to the interposition of the magnetic sheet 13.

Figure 13:
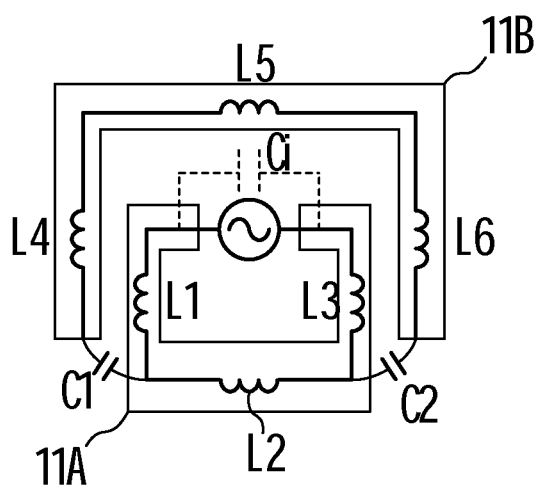
FIG. 13 is an equivalent circuit diagram of an RFID tag portion shown in FIG. 12.

FIG. 13 is an equivalent circuit diagram of an RFID tag portion shown in FIG. 12. Here, the first auxiliary conductor 11A is represented by inductors L1, L2, and L3, and the second auxiliary conductor 11B is represented by inductors L4, L5, and L6. A first LC resonant circuit includes a capacitance Ci in an RFIC element 14 and the inductors L1, L2, and L3 of the first auxiliary conductor 11A. In addition, a second LC resonant circuit includes capacitances C1 and C2 between the first auxiliary conductor 11A and the second auxiliary conductor 11B and the inductors L4, L5, and L6 of the second auxiliary conductor 11B. A resonance frequency f1 of the first LC resonant circuit and a resonance frequency f2 of the second LC resonant circuit can be expressed as follows.

$$f1 = 1/[2\pi\sqrt{\{Ci(L1+L2+L3)\}}]$$

$$f2 = 1/[2\pi\sqrt{\{(C1+C2)(L1+L2+L3+L4+L5+L6)\}}]$$

Since there is mutual inductance between the inductance (L1, L2, and L3) of the first auxiliary conductor 11A and the inductance (L4, L5, and L6) of the second auxiliary conductor 11B, the first LC resonant circuit and the second LC resonant circuit are coupled to each other.

Figure 14:
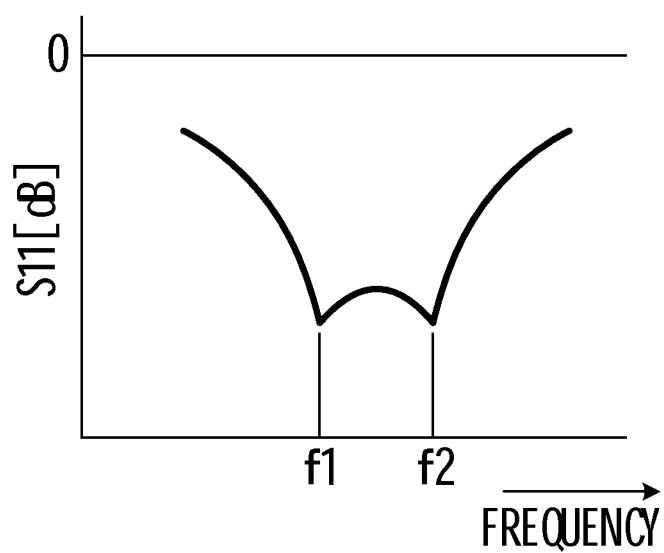
FIG. 14 is a diagram showing a return loss characteristic when viewed from a feed circuit of the RFID tag portion shown in FIG. 12.

FIG. 14 shows a return loss characteristic when viewed from a feed circuit of the RFID tag portion shown in FIG. 12. As described above, since there are two resonance frequencies f1 and f2, and f1 and f2 are different from each other, widening of the frequency band can be achieved as shown in FIG. 14. Note that, due to the influence of the above-described mutual inductance, the frequency interval between two poles of the return loss characteristic is further extended. The mutual inductance can be adjusted by making the shapes of the first auxiliary conductor and the second auxiliary conductor different from each other, or displacing the positions of the first auxiliary conductor and the second auxiliary conductor, or partially interposing a magnetic sheet between the first auxiliary conductor and the second auxiliary conductor, or the like. In this manner, the frequency interval between the two poles may be determined.

Fifth Preferred Embodiment

Figure 15A:
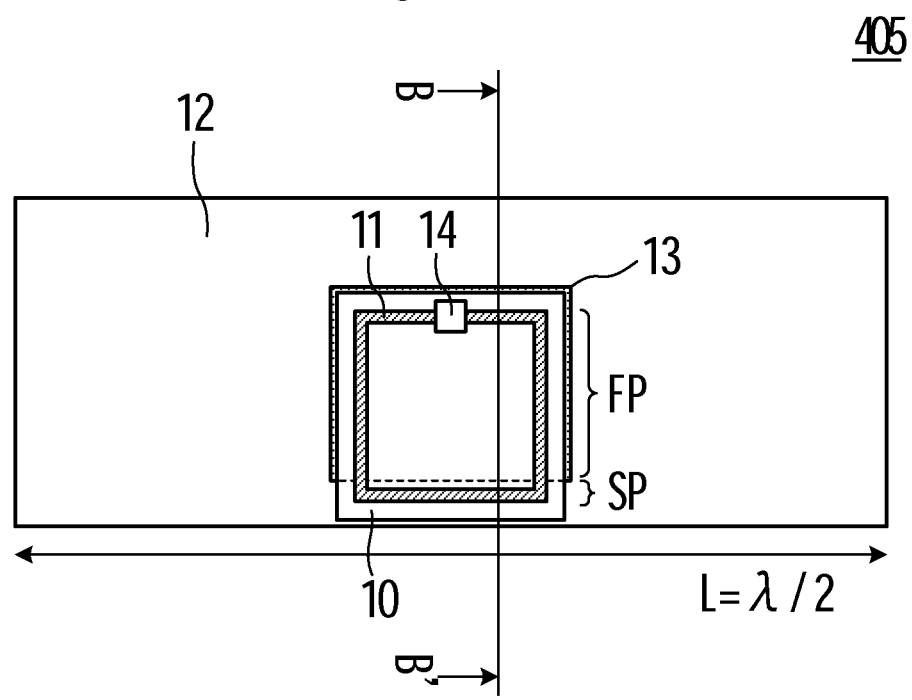
FIG. 15A is a plan view of a communication terminal apparatus 405 of a fifth preferred embodiment of the present invention.
Figure 15B:
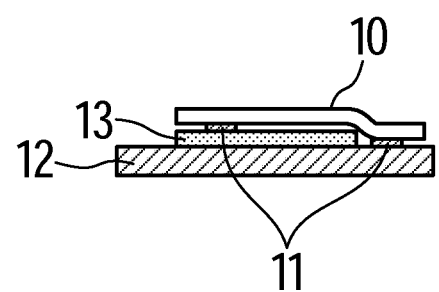
FIG. 15B is a cross-sectional view of a B-B' portion of FIG. 15A.

FIG. 15A is a plan view of a communication terminal apparatus 405 of a fifth preferred embodiment, and FIG. 15B is a cross-sectional view of a B-B' portion of FIG. 15A. In this example, a loop-shaped conductor 11 is patterned on an under surface of a base sheet 10. The loop-shaped conductor 11 includes a first portion FP facing a flat conductor with a magnetic sheet 13 therebetween, and a second portion SP directly electrically connected to the flat conductor 12 without the magnetic sheet 13 therebetween.

An RFIC element 14 (a feed circuit of the RFIC element 14) is connected to a first end and a second end of the loop-shaped conductor 11. The RFIC element includes therein a capacitance. By this capacitance and an inductance of the loop-shaped conductor 11, an LC resonant circuit is provided. A differential potential is applied to the loop-shaped conductor 11 from the feed circuit at a resonance frequency at which the loop-shaped conductor 11 achieves impedance matching with the feed circuit, and a central location between the first and second ends of the loop-shaped conductor 11 (a location farthest from the feed circuit) is a current maximum point. The current maximum point is also a virtual ground potential. The above-described resonance frequency is, for example, a frequency in the UHF band such as the 900 MHz band.

Figure 16:
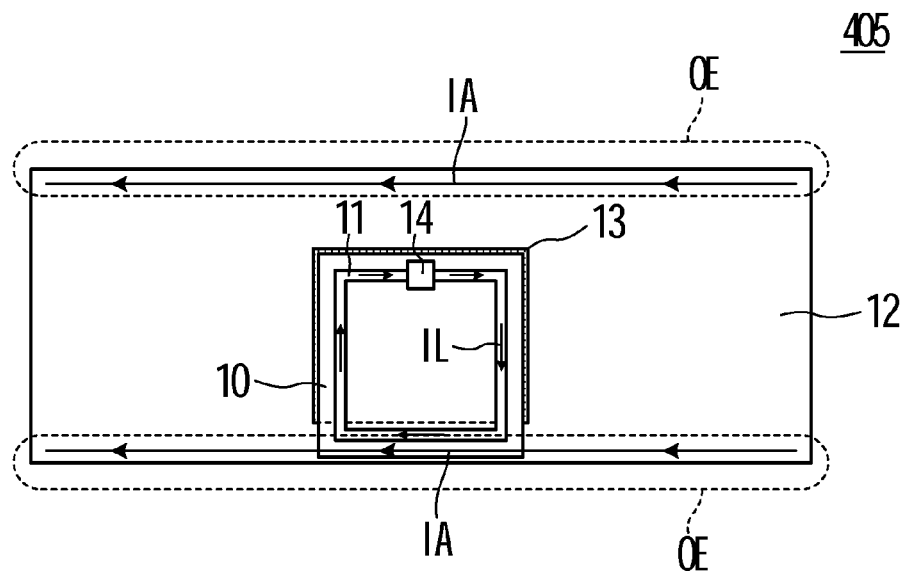
FIG. 16 is a diagram showing the states of a current flowing through a loop-shaped conductor 11 of an RFID tag and currents flowing through a flat conductor 12.

FIG. 16 is a diagram showing the states of a current flowing through the loop-shaped conductor 11 of an RFID tag and currents flowing through the flat conductor 12. When high-frequency power with the above-described resonance frequency (UHF band) is supplied to the loop-shaped conductor 11 from the RFIC element 14, currents IA flow through the flat conductor 12 by a current IL flowing through the loop-shaped conductor 11. Since there is direct coupling instead of inductive coupling shown in FIG. 7C, the directions of the currents IA are the same as that of the current IL flowing through the loop-shaped conductor 11. At this time, due to the edge effect, the current density of edge portions OE of the flat conductor 12 is high. Hence, the RFID tag 301 is disposed on the flat conductor 12 such that the second portion SP of the loop-shaped conductor 11 extends along one end of the flat conductor 12. In general, it is sufficient that the second portion SP of the loop-shaped conductor 11 be disposed at a location closer to the side of one end edge portion of the flat conductor 12 than the center (the center of gravity) of the flat conductor 12.

By propagation of the induced currents IA through the flat conductor 12, the flat conductor 12 acts as a radiation element. When the wavelength of the used frequency band is represented by $\lambda$, it is preferred that a dimension L in the longitudinal direction of the flat conductor 12 be $L=\lambda/2$ or $L \approx \lambda/2$, for example. Accordingly, the flat conductor 12 acts as a half-wave radiation element.

With the structure shown above, the flat conductor 12 disposed near the loop-shaped conductor 11 can be used as an antenna element, and thus, the communication terminal apparatus 405 including a compact and slim RFID tag with a long communication distance can be obtained without increasing the size of the loop-shaped conductor 11.

It is preferred that the second portion SP of the loop-shaped conductor 11 include the above-described current maximum point, and the loop-shaped conductor 11 be directly coupled (directly electrically connected) to the flat conductor 12 in a region including the current maximum point. That is, in the loop-shaped conductor 11, the current density is low near a feed point, and the current density is high at a location farthest from the feed point. Thus, if the loop-shaped conductor 11 is coupled to the flat conductor 12 at the second portion SP including a portion of the loop-shaped conductor 11 that has the highest current density, unwanted coupling between the loop-shaped conductor 11 and the flat conductor 12 (coupling in which a current flowing through the flat conductor 12 by the coupling does not contribute to radiation) is suppressed or prevented, which makes it possible to obtain an RFID tag with small insertion loss and the communication terminal apparatus 405 including the RFID tag.

It is preferred that the loop-shaped conductor 11 be disposed on the flat conductor 12 such that the second portion SP thereof is near an end edge portion of the flat conductor 12. It is particularly preferred that the second portion SP of the loop-shaped conductor 11 be formed linearly, and the loop-shaped conductor 11 be disposed close to the flat conductor 12 so as to be parallel or substantially parallel to a linear end edge portion of the flat conductor 12. By such disposition, while eddy current loss in the loop-shaped conductor 11 is suppressed or prevented, the distance between one of the main radiation portions (the end edge portions of the flat conductor 12) and the current maximum point of the loop-shaped conductor 11 is shortest, thus enabling reduction in power loss.

Sixth Preferred Embodiment

A sixth preferred embodiment of the present invention shows an example of an RFID tag formed by laminating a plurality of sheets.

Figure 17:
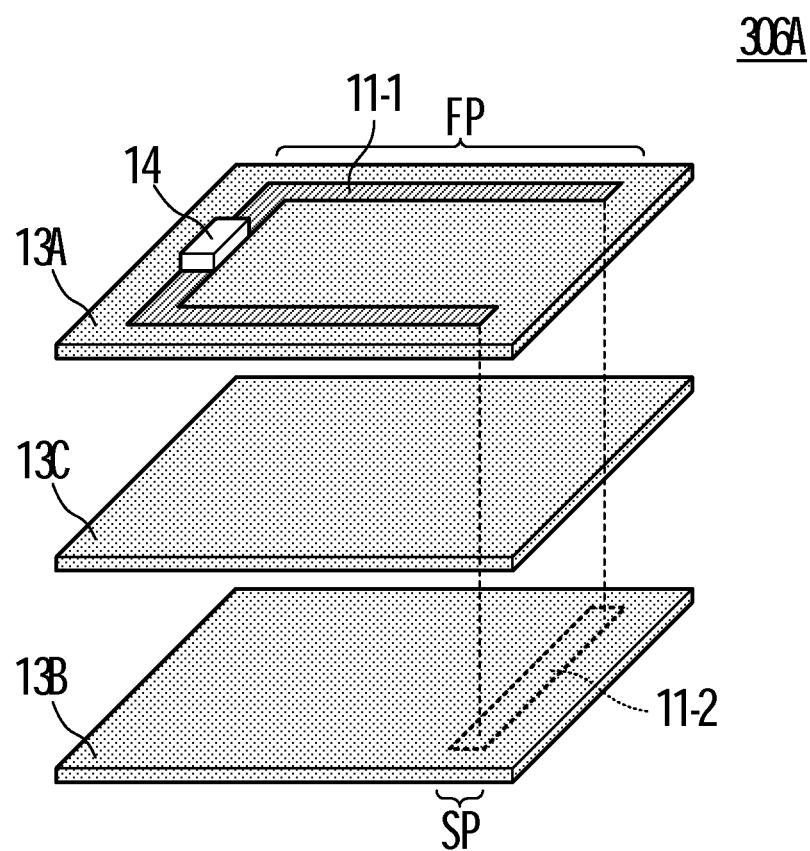
FIG. 17 is an exploded perspective view of an RFID tag 306A of a sixth preferred embodiment of the present invention.

FIG. 17 is an exploded perspective view of an RFID tag 306A of the sixth preferred embodiment. A portion (three sides) 11-1 of a loop-shaped conductor is located on a top surface of a ferrite sheet 13A, and a portion (one side) 11-2 of the loop-shaped conductor is located on an under surface of a ferrite sheet 13B. Then, the loop-shaped conductors 11-1 and 11-2 are connected to each other through via conductors provided in the ferrite sheets 13A, 13B, and 13C. The ferrite sheets 13A and 13B are ferrite with low permeability (e.g., relative permeability $\mu r=1$), and the ferrite sheet 13C is ferrite with high permeability (e.g., relative permeability $\mu r=100$). An RFIC element 14 is connected to the portion 11-1 of the loop-shaped conductor. Normally, after forming a laminate including the three ferrite sheets 13A, 13B, and 13C, the RFIC element 14 is mounted on the laminate.

In a state where the RFID tag 306A is mounted on a flat conductor such that the portion 11-2 of the loop-shaped conductor is directly electrically connected to the flat conductor, the ferrite sheet 13C is interposed between the portion 11-1 of the loop-shaped conductor and the flat conductor. That is, the portion 11-1 of the loop-shaped conductor defines a first portion FP of the loop-shaped conductor. Since the ferrite sheet 13C is not interposed between the portion 11-2 of the loop-shaped conductor and the flat conductor, the portion 11-2 of the loop-shaped conductor defines a second portion SP of the loop-shaped conductor.

Figure 18:
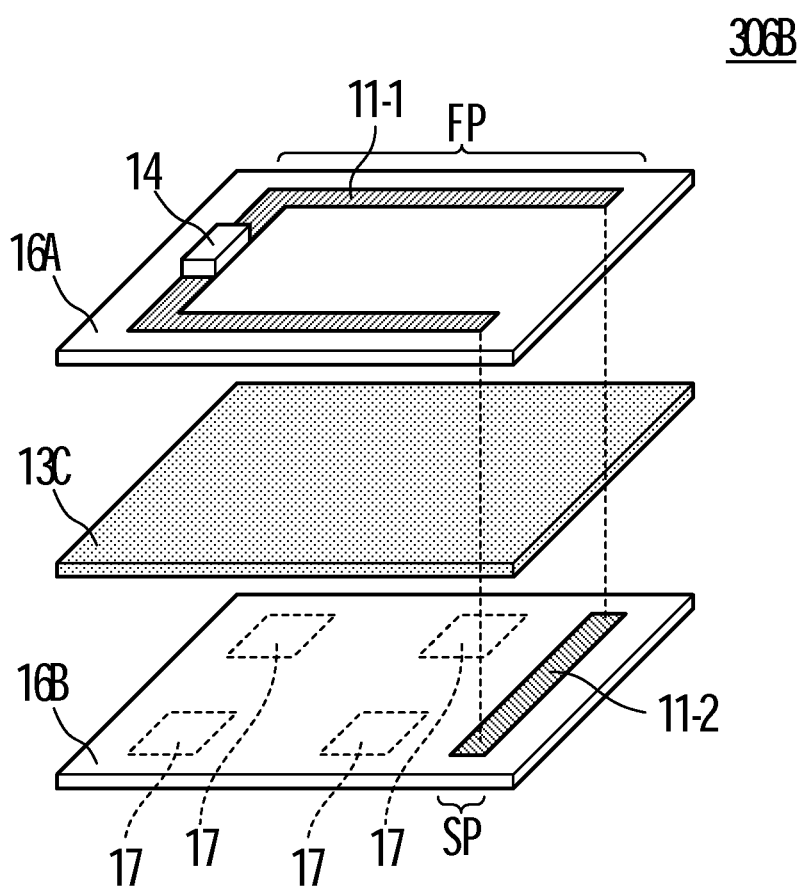
FIG. 18 is an exploded perspective view of another RFID tag 306B of the sixth preferred embodiment of the present invention.

FIG. 18 is an exploded perspective view of another RFID tag 306B of the sixth preferred embodiment. A portion (three sides) 11-1 of a loop-shaped conductor is located on a top surface of a dielectric (non-magnetic) sheet 16A, and a portion (one side) 11-2 of the loop-shaped conductor is located on a top surface of a dielectric (non-magnetic) sheet 16B. Mounting electrodes 17 are located on an under surface of the dielectric sheet 16B. Then, the loop-shaped conductors 11-1 and 11-2 are connected to each other through via conductors provided in the dielectric sheet 16A and a ferrite sheet 13C. An RFIC element 14 is connected to the portion 11-1 of the loop-shaped conductor.

Similarly to the case of the RFID tag 306A, the portion 11-1 of the loop-shaped conductor defines a first portion FP of the loop-shaped conductor, and the portion 11-2 of the loop-shaped conductor defines a second portion SP of the loop-shaped conductor. When the RFID tag 306B is mounted on a flat conductor using the mounting electrodes 17, the portion 11-2 of the loop-shaped conductor faces the flat conductor with the dielectric sheet 16B therebetween, by which the portion 11-2 of the loop-shaped conductor is coupled to the flat conductor in an electromagnetic field.

By using a configuration in which the portion 11-2 of the loop-shaped conductor is located on the same plane as the mounting electrodes 17, and a via conductor is provided in the dielectric sheet 16B, and the portion 11-2 of the loop-shaped conductor is connected to the portion 11-1 of the loop-shaped conductor through the via conductor, the portion 11-2 of the loop-shaped conductor can be directly electrically connected (DC coupled) to the flat conductor.

Other Preferred Embodiments

An RFIC element shown in each of the above-described preferred embodiments preferably is a circuit including a memory circuit and a logic circuit, but may be an IC element including only a high-frequency circuit. Alternatively, the RFIC element may include a matching circuit such as an RFIC chip and a resonant circuit connected to the chip. Then, the configuration may be such that a loop-shaped conductor is coupled to the matching circuit in an electromagnetic field.

An antenna device according to various preferred embodiments of the present invention is not only used as an RFID tag in a UHF-band RFID system, but can also be used as an antenna device for a reader/writer, for example. In addition, an antenna device according to various preferred embodiments of the present invention can be used in other frequency bands such as the HF band or can be used in other communication systems than an RFID system, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   a loop-shaped conductor to which a feed circuit is connected or coupled;
   a magnetic sheet provided in parallel or substantially in parallel to the loop-shaped conductor; and
   a flat conductor disposed so as to face the loop-shaped conductor, and having an area larger than an outer dimension of the loop-shaped conductor; wherein
   the loop-shaped conductor includes a first portion facing the flat conductor with the magnetic sheet therebetween, and a second portion facing the flat conductor without the magnetic sheet therebetween;
   the second portion of the loop-shaped conductor is disposed close to an end edge portion of the flat conductor; and
   the flat conductor acts as a radiation element when the second portion of the loop-shaped conductor is directly electrically connected or coupled in an electromagnetic field to the end edge portion of the flat conductor and then a current is guided to the end edge portion of the flat conductor.

2. The antenna device according to claim 1, wherein the second portion of the loop-shaped conductor is a portion along the end edge portion of the flat conductor while the first portion is a rest of the loop-shaped conductor.

3. The antenna device according to claim 1, wherein
   the magnetic sheet includes a first main surface and a second main surface that face each other,
   the second main surface faces the flat conductor, and
   the first portion of the loop-shaped conductor is provided on the first main surface of the magnetic sheet while the second portion of the loop-shaped conductor is provided on the second main surface of the magnetic sheet.

4. The antenna device according to claim 1, wherein the loop-shaped conductor includes a first auxiliary conductor and a second auxiliary conductor that are coupled to each other by a capacitance in at least two positions.

5. The antenna device according to claim 1, wherein the second portion of the loop-shaped conductor is linear, and the loop-shaped conductor is parallel or substantially parallel to a linear end edge portion of the flat conductor.

6. The antenna device according to claim 1, wherein the flat conductor is a ground conductor located on a printed wiring board.

7. The antenna device according to claim 1, wherein the flat conductor is a metal housing.

8. A communication terminal apparatus comprising:
   the antenna device according to claim 1; and
   an RFIC element directly connected or coupled in an electromagnetic field to the loop-shaped conductor of the antenna device.

9. The communication terminal apparatus according to claim 8, wherein the flat conductor is a ground conductor located on a printed wiring board.

10. The communication terminal apparatus according to claim 8, wherein the flat conductor is a metal housing.

11. The communication terminal apparatus according to claim 8, wherein the RFIC element is configured to operate in a UHF-band RFID system where the RFIC element achieves matching with the loop-shaped conductor in a UHF band.

* * * * *